United States Patent
Chiang et al.

(10) Patent No.: US 9,326,006 B2
(45) Date of Patent: Apr. 26, 2016

(54) ADAPTIVE PRE-FILTERING SYSTEM

(75) Inventors: Patricia Chiang, Singapore (SG); Lucas Hui, Singapore (SG)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 3032 days.

(21) Appl. No.: 11/514,723

(22) Filed: Sep. 1, 2006

(65) Prior Publication Data

US 2007/0064816 A1    Mar. 22, 2007

(30) Foreign Application Priority Data

Sep. 16, 2005  (SG) ................. 200505996-9

(51) Int. Cl.
| | |
|---|---|
| H04N 7/12 | (2006.01) |
| H04N 19/86 | (2014.01) |
| H04N 19/139 | (2014.01) |
| H04N 19/176 | (2014.01) |
| H04N 19/172 | (2014.01) |
| H04N 19/61 | (2014.01) |
| H04N 19/117 | (2014.01) |
| H04N 19/14 | (2014.01) |

(52) U.S. Cl.
CPC ............ *H04N 19/86* (2014.11); *H04N 19/117* (2014.11); *H04N 19/139* (2014.11); *H04N 19/14* (2014.11); *H04N 19/172* (2014.11); *H04N 19/176* (2014.11); *H04N 19/61* (2014.11)

(58) Field of Classification Search
CPC .......... G06T 5/20; G09G 5/391; G09G 5/395; H04N 19/117; H04N 19/139
USPC ...................... 375/130–153, 240.01–240.29; 704/500–504
IPC .............. G10L 19/00,21/04; H04N 7/12, 11/02, H04N 11/04; H04B 1/00, 1/66
See application file for complete search history.

(56) References Cited

U.S. PATENT DOCUMENTS

| | | | | |
|---|---|---|---|---|
| 5,231,484 A | * | 7/1993 | Gonzales et al. | ........ 375/240.04 |
| 5,568,196 A | | 10/1996 | Hamada et al. | |
| 6,037,986 A | * | 3/2000 | Zhang et al. | ............. 375/240.12 |

(Continued)

FOREIGN PATENT DOCUMENTS

| | | | | |
|---|---|---|---|---|
| EP | 0 396 360 A2 | | 11/1990 | |
| WO | WO 2006007285 A1 | * | 1/2006 | ............... H04N 7/26 |

OTHER PUBLICATIONS

European Search Report dated Oct. 11, 2010 in connection with European Patent Application No. EP 06 25 4815.

(Continued)

*Primary Examiner* — Gims Philippe

(74) *Attorney, Agent, or Firm* — Allen, Dyer, Doppelt, Milbrath & Gilchrist, P.A.

(57) ABSTRACT

A method, system and apparatus for adaptive pre-filtering includes: extracting tuning parameters from video data in a video encoding process; processing the tuning parameters to generate control parameters representative of properties of the video data; coupling the control parameters to a filter response; generating filter coefficients according to the filter response; and filtering the video data using the filter coefficients prior to video encoding. The filtering of video data may thus be adapted to one or more tuning parameters of the video data and the encoding process. The filtering may decrease the complexity of encoding by an attenuation of high frequency signals, effectively decreasing the quantization step and reducing compression artifacts.

22 Claims, 6 Drawing Sheets

(56) References Cited

U.S. PATENT DOCUMENTS

| | | |
|---|---|---|
| 6,281,942 B1 | 8/2001 | Wang |
| 6,600,784 B1 * | 7/2003 | Divakaran et al. ....... 375/240.14 |
| 6,747,991 B1 * | 6/2004 | Hemy et al. .................. 370/468 |
| 2001/0019588 A1 | 9/2001 | Naito et al. |
| 2002/0001345 A1 | 1/2002 | Yamada et al. |
| 2002/0118748 A1 | 8/2002 | Inomata et al. |
| 2002/0122494 A1 | 9/2002 | Sheralzin et al. |
| 2004/0213345 A1 * | 10/2004 | Holcomb et al. ........ 375/240.03 |
| 2005/0013369 A1 | 1/2005 | Lee |
| 2005/0105815 A1 * | 5/2005 | Zhang et al. .................. 382/251 |

OTHER PUBLICATIONS

C.A. Segall and A.K. Katsaggelos. "Pre-and Post-Processing Algorithms for Compressed Video Enhancement", Proc of the Asilomar Conference on Signals and Systems, pp. 1369-1373.

* cited by examiner

ADAPTIVE PRE-FILTERING SYSTEM

CROSS-REFERENCE TO RELATED APPLICATION AND CLAIM OF PRIORITY

The present application is related to Singapore Patent Application No. 200505996-9, filed Sep. 16, 2005, entitled "A METHOD AND SYSTEM FOR ADAPTIVE PRE-FILTERING FOR DIGITAL VIDEO SIGNALS". Singapore Patent Application No. 200505996-9 is assigned to the assignee of the present application and is hereby incorporated by reference into the present disclosure as if fully set forth herein. The present application hereby claims priority under 35 U.S.C. §119(a) to Singapore Patent Application No. 200505996-9

FIELD OF THE INVENTION

The invention relates generally to video preprocessing techniques for improving encoded video data quality. In particular, the invention relates to adaptive pre-filtering of input video data before video encoding using selective tuning parameters for controlling of filtering.

BACKGROUND OF THE INVENTION

Video encoders are now commonly used in consumer end products like DVD reader/writers at consumer affordable prices. Video encoders have also been increasingly found in server software applications for real time internet video streaming. However, these video encoders often do not perform up to par as compared with professional encoders. The resulting poorly encoded video images often contain video artifacts such as blocking, corner outlier, and ringing.

Besides the effects of encoding technology of the video encoders, video pre-processing and post-processing are also performed to improve the quality of the encoded video. Video post-processing processes the decoded video from the bitstream while video pre-processing processes input video data prior to video encoding.

Due to competitiveness in the market of video encoders, low cost solutions with inter-operability of video decoders are preferred. As such, use of video pre-processing is an important method for reducing encoding complexity and for improving video quality for video encoders. This is especially so when the bitstream is decoded by third party video players. It is also desired that the pre-processing solution can be built into existing encoder solutions or with minimal hardware modification such that the system cost is not significantly increased.

Some existing techniques for pre-processing apply pre-filtering on the residual image rather than the image itself. This may result in error residual propagation in a group of pictures giving undesired defects in especially lengthy groups. In addition, spatial filtering is difficult to apply within the video encoder as it limits the filtering in pre-defined block sizes.

Segall, C. A. and Katsaggelos, A. K., "Pre- and Post-processing Algorithms for Compressed Video Enhancement", provides a good summary of the existing techniques related to pre-processing video data for compressed video enhancement. The different techniques include operating directly on intensity data of original image using for example a low pass filter, operating inside the encoder and using quantized DCT coefficients to remove insignificant features. The disclosed work involves pre-filtering the residual between predicted and current frame with response of filter coupled to quantization scale and distortion metric on blocking artifacts minimized.

In U.S. Pat. No. 6,037,986, "Video Pre-processing Method and Apparatus with Selective Filtering based on Motion Detection", by Zhang et al. describes an adaptive low pass vertical filter (7 taps) selected from predetermined filter coefficients using pre-compression data like bit-rate range, motion metric, frame wise motion and bit-rate or post-compression data like moving average of quantization, sum of absolute motion vectors, number of bits per compressed frame.

In U.S. Pat. No. 6,281,942, "Spatial and Temporal Filtering Mechanism for Digital Motion Video Signals", by Wang, a technique operating a spatial filter using a 4×4 block with control of heavy, light or no filter dependency on thresholding of block variance is disclosed.

In U.S. Pat. No. 5,231,484, "Motion Video Compression System with Adaptive Bit Allocation and Quantization", Gonzales et al. describes a pre-processing method that selects between 2 sets of 3-tap filters or none according to the degree of quantization.

Other existing methods may also use motion estimation engines to perform motion compensated 3D spatial and temporal filtering. When motion estimation is incorrect, these motion compensated techniques disadvantageously create undesired artifacts such as smearing regions. However, additional motion estimators for correcting these artifacts will disadvantageously increase the costs of these pre-processing solutions.

Pre-filtering may also result in the loss of video resolution, giving reduction in sharpness of image as filter strength of the pre-filters increases. Often the blurring of the image is not compensated by the gain in encoding efficiency.

Furthermore, variable delayed response between filtering and feedback of post-compression parameters are often not considered. In situations of long delay especially when parameters, which are affected by pre-filtering, are used, oscillations between extreme filtering states may occur, leading to instability in video encoding.

Therefore, a need exists for an improved method for improving visual quality of video especially in difficult video sequences with fast motion and low bit rate applications

SUMMARY OF THE INVENTION

The present invention seeks to provide a method and system for adaptive pre-filtering of input video data for video encoding.

Accordingly, in one aspect, the present embodiment provides a method for adaptive pre-filtering of input video data for video encoding using a linear filter module, comprising the steps: receiving the input video data; extracting at least one tuning parameter according to type of video encoding; processing the at least one tuning parameter to generate at least one corresponding control parameter; coupling the at least one control parameter to a predetermined filter response; generating a plurality of filter coefficients based on the predetermined filter response; and filtering the input video data with the linear filter module having the applied plurality of filter coefficients; wherein the at least one tuning parameter may comprise one or more of the following: motion, quantization, variance and mean square error prediction.

In a second aspect, the present embodiment provides, a video processing system comprising: an adaptive pre-filtering system for adaptive pre-filtering of input video data for video encoding comprising: a filter module for receiving and filtering the input video data to produce a filtered video data, the filter module responsive to a plurality of predetermined filter responses; a video encoder for encoding and compression of the filtered video data according to a encoding process; an extraction module for extracting at least one tuning parameter from the input video data according to the encoding process; a computation module for receiving and processing the at least one tuning parameter into at least one control parameter; and an integration module for processing the at least one control parameter and for selecting one of the plurality of filter responses; wherein the at least one tuning parameter may comprise one or more of the following: motion, quantization, variance and mean square error prediction.

BRIEF DESCRIPTION OF THE DRAWINGS

Embodiments of the present invention will now be more fully described, by way of example, with reference to the drawings of which.

DETAILED DESCRIPTION

In the following description, details are provided to describe the preferred embodiments of the invention. It shall be apparent to one skilled in the art, however, that the embodiments may be practiced without such details. Some of these details may not be described at length so as not to obscure the preferred embodiments.

Adaptive pre-filtering of video data reduces video data complexity by filtering and thus enables ease of encoding of video data by video encoders. Video artifacts like blocking and ringing which are pre-dominant in low bit rate applications may thus be reduced. Filtering of pre-encoded images to reduce encoding complexity is thus used to improve the visual quality of video by using smaller quantization step size.

Figure 7:
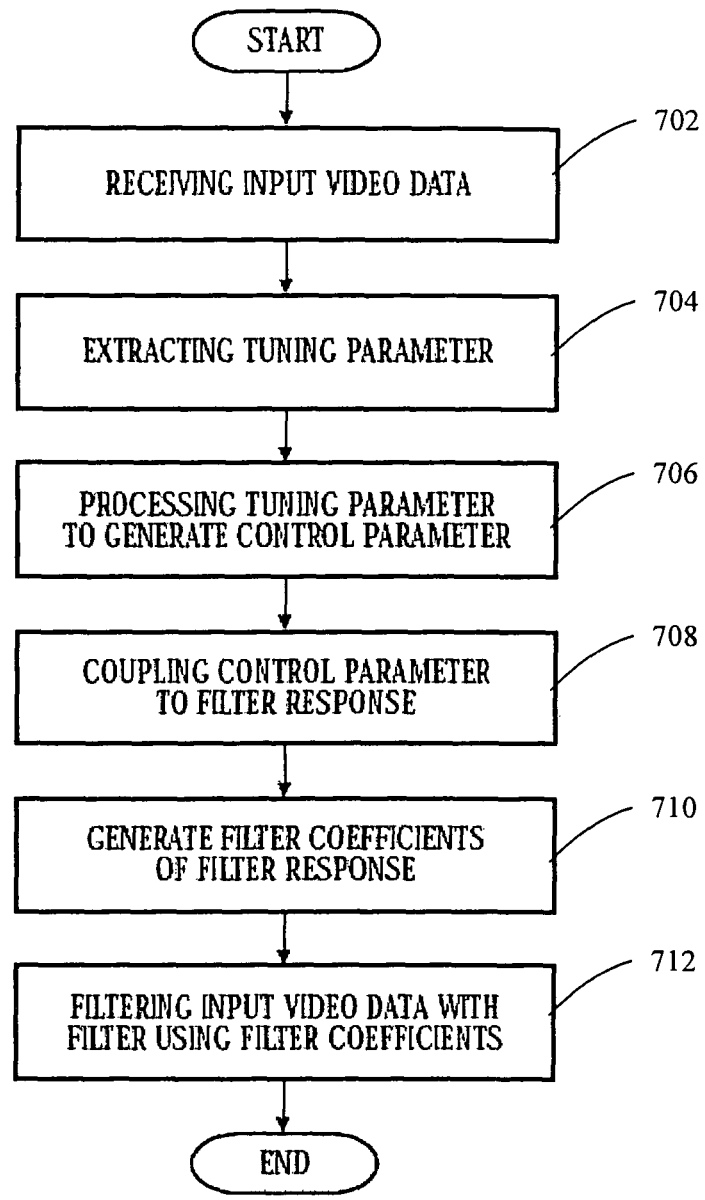
FIG. 7 illustrates a flow chart of a method in accordance with the present embodiment.

Referring to FIG. 7, the present embodiment discloses a method for adaptive pre-filtering comprising the steps of:
  extracting tuning parameters from video encoding process;
  processing these tuning parameters to generate control parameters representative of the properties of the video data processed;
  coupling the control parameters to filter response;
  generating filter coefficients on selected filter response; and filtering the video data with the filter coefficients before video encoding.

To reduce the impact of loss in video resolution when pre-filtering input video data before video compression, a series of filters are designed as low pass filters with gradual high frequency attenuation instead of steep cut-off frequency, such that high frequency components of edges are retained partially and edges are subjectively better.

To further resolve the variable implementation latency between the pre-filtering process and the encoding process, the linear filter reactivity is decreased by introducing appropriate number of intermediate transition filtering stages according to the length of latency interval, hence making the pre-filtering algorithm more robust to the systems with different latencies.

The filtering of input video data is thus adapted to at least one or more tuning parameters of the input video data and the encoding process of the video encoder. These tuning parameters being extracted are processed into control parameters for adaptive pre-filtering of each frame of the video data. The filtering decreases the complexity of video encoding by attenuation of high frequency signals, effectively decreasing the quantization step and reducing compression artifacts. The tuning parameters comprise: motion, quantization, variance and mean square error prediction. At least one of these tuning parameters would need to be utilized.

The adaptive pre-filtering is applied as a pre-processing technique for video encoders, examples of which are MPEG-1, MPEG-2, MPEG-4, H.263, H.264, WMV and VC9 to reduce encoding complexity with the achievement of better subjective quality or lower bit rates.

The present embodiment may be operated in conjunction with other pre-processing functions to reduce hardware complexity for example video format converters or video spatial scalers.

Figure 1:
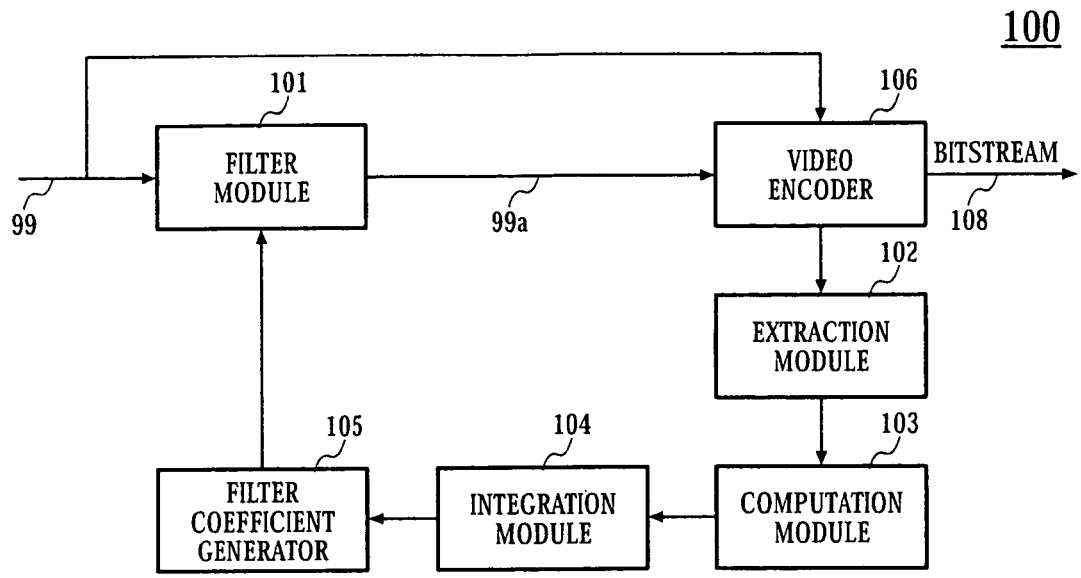
FIG. 1 illustrates a block diagram of a system in accordance with a present embodiment.

Referring to FIG. 1, a functional block diagram of a adaptive pre-filtering system 100 in accordance with the present invention is shown. The system 100 comprises an adaptive filter module 101 which receives and filters the input video data 99 producing filtered video data 99a, and a video encoder 106 for encoding and compression of the input video data 99.

The system 100 further comprises a tuning parameter extraction module 102 for extracting tuning parameters from relevant encoding sub-processes of the video encoder 106, a computation module 103 for receiving the tuning parameters extracted and for processing them into control parameters.

An integration module 104 is further provided for processing these control parameters and for computing and selecting a suitable filter response from a plurality of predetermined filter responses.

A filter coefficient generator (FCG) 105 is also part of the system 100 and functions to generate the plurality of filter coefficients to be programmed for the filter module 101.

The selected filter response may be combined with other filtering functions to derive an overall filter function such that additional filtering is removed and the picture quality does not suffer from excess ringing phenomenon. In the case of CIF picture encoding from D1 pictures, the filter may be designed to incorporate the decimation bandwidth considerations and operate on video data prior to down-sampling.

Figure 2:
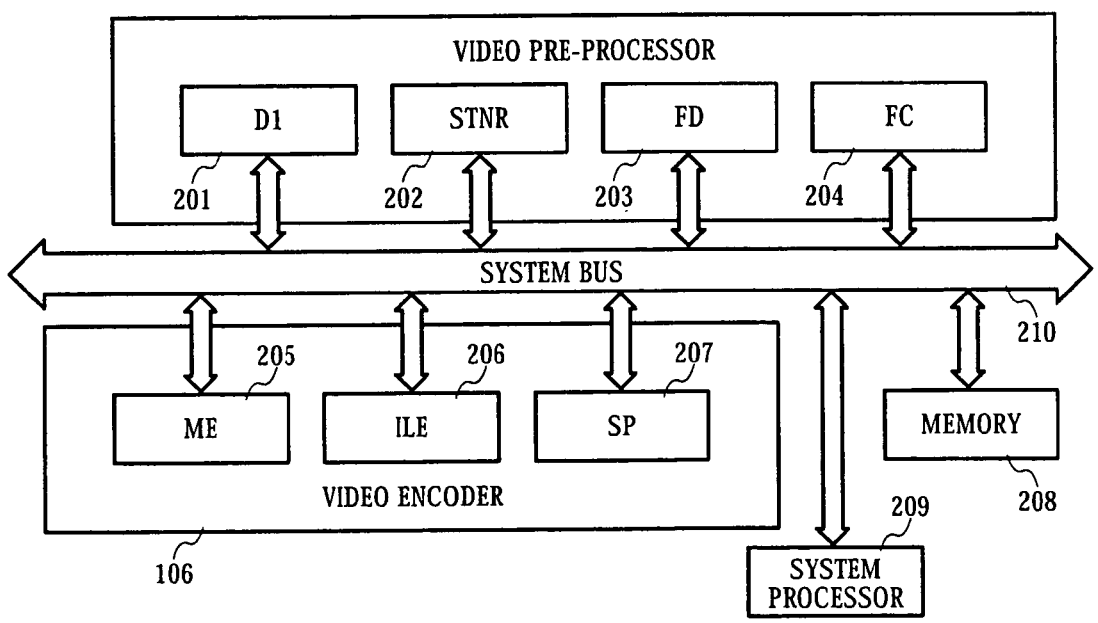
FIG. 2 illustrates a block diagram of a MPEG-2 encoding system implementing the present embodiment.

Referring to FIG. 2, a block diagram of a system using MPEG-2 video encoding implementing the present embodiment is shown. The adaptive pre-filtering system 100 of the present embodiment may be embedded within the MPEG-2 system comprising the video pre-processor and video encoder subsystems. The system may for example comprise:

D1 interface 201 that decodes input serial digital video;

Spatial Temporal Noise Filter STNR 202 that removes digital noise in video data through spatial and temporal filtering;

Film Detector FD 203 that performs measurement for progressive-interlace detection, scene change detection and inverse 3-2 pulldown;

Format Converter FC 204 that enables video format and size conversion;

Motion estimator ME 205 that is designed to search for motion vectors within a limited search window to predict the motion of video data and perform motion compensation;

In-Loop Encoder ILE 206 that performs video encoding processes like discrete cosine transform, quantization and variable length encoding, inverse quantization and inverse discrete cosine transform;

System processor SP 207 that does system control, rate control and variable length encoding.

The MPEG-2 system may further comprise a system processor 209 for providing control and processing capabilities to the video pre-processor and the video encoder via the system bus 210 and the memory 208. The computation module 103, the integration module 104 and the filter coefficient generator 105 may be implemented via software by the system processor 209.

The extraction module 102 may possibly be implemented by software, but may also be implemented via hardware depending on the design of the video encoder.

The Filter module 101 for adaptive pre-filtering may preferably be incorporated into the Format Converter 204 that supports a plurality of video formats and size conversions. The generic architecture of the Format Converter 204 comprises of at least one horizontal filter in parallel and at least one vertical filter in parallel.

Each filter of the Format Converter 204 may be described by 1 or more sets of filter coefficients sufficient for polyphase filtering. The filter coefficients may be programmed by the external system processor 207 and modified during start of each field interval. Each component of video Y, Cr, Cb are filtered to the desired size and chroma sampling format by interpolation and decimation.

Figure 3:
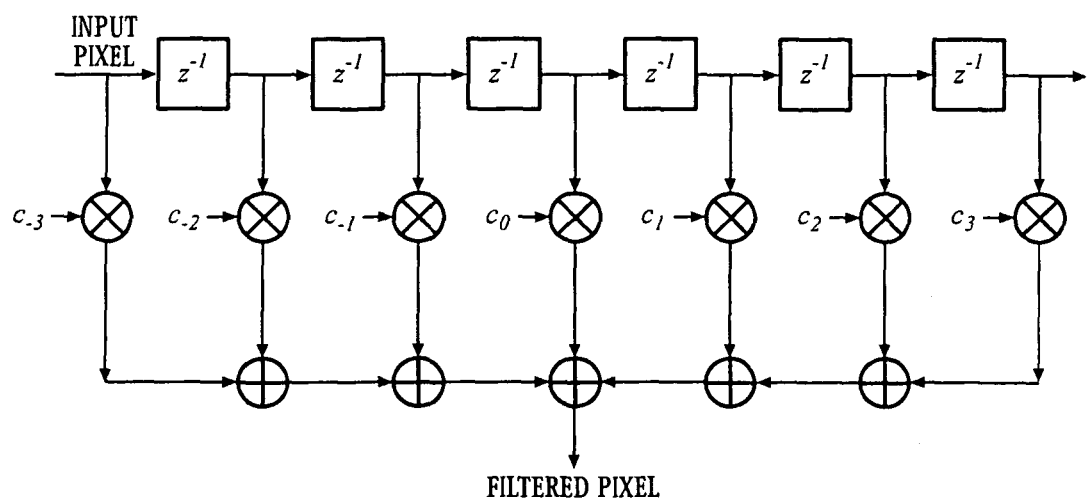
FIG. 3 illustrates a programmable 7-tap filter module in accordance with the present embodiment.

Instead of using separate filters in series for adaptive pre-filtering, the size conversion filters are designed with pre-filtering in mind. An example of an architecture of the filter module 101 for adaptive pre-filtering is shown in FIG. 3. The description of the present embodiment will often refer to the example of CIF picture encoding from D1 video input. The filter module 101 comprises of a series of low pass filters with different cut off frequencies. Those skilled in the art would be aware that that the scope of the invention encompasses the variety of different video format input and output.

It is known from experimental observations that as the cut off frequency of filtering decreases, there is a rapidly decreasing Peak Signal to Noise Ratio (PSNR) in pre-encoded video while an increase in coding efficiency is represented by a gradual drop in PSNR for encoded video.

This coding efficiency however is not large enough to compensate for the drop in picture sharpness. While the encoded pictures experience a decrease in sharpness or resolution, the blocking and ringing artifacts caused by poor encoding are reduced. The filter that has the best performance in video sequences has cut-off frequencies close to half the video bandwidth.

In view of the above findings, a 1.5 radians filter is chosen as the basic decimation filter to generate a set of filters with different frequency responses. Compared to a normal low pass filter design that has a rectangular band, the filter design has a plurality of rectangular bands that result in a staircase-like function with steps at different frequencies, as shown in an example in FIG. 4.

In the present example, the magnitudes are normalized and range between 1.0 to 0.3, corresponding to frequency responses ranging between 1.5 to 0.25 radians. The frequency response may be normalized according to the 1.5 radian bandwidth resulting in a normalized range of between 1.0 to 0.167. The stronger filter has the first step at an equal or lower frequency and has an equal or lower magnitude at the last step with the basic cut-off frequency. This design provides higher attenuation at higher frequencies but retains part of the high frequency components.

Figure 4:
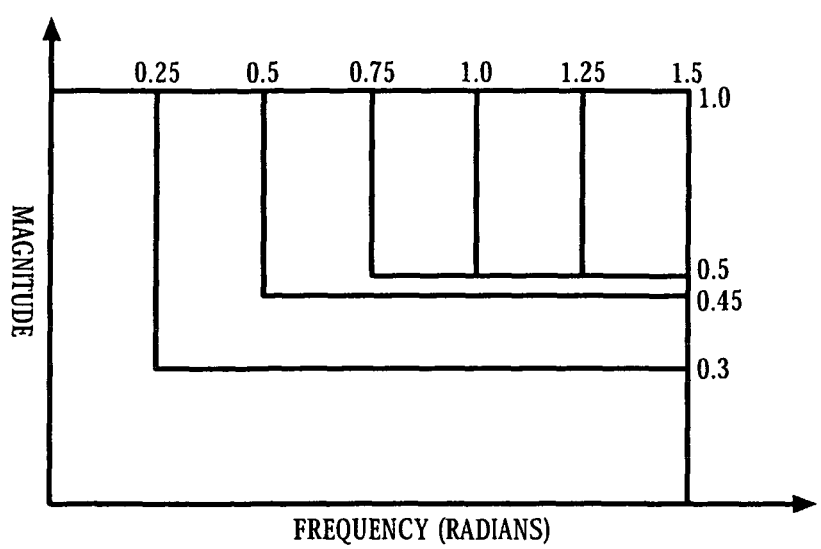
FIG. 4 illustrates ideal frequency responses of the filter module of FIG. 3.
Figure 5:
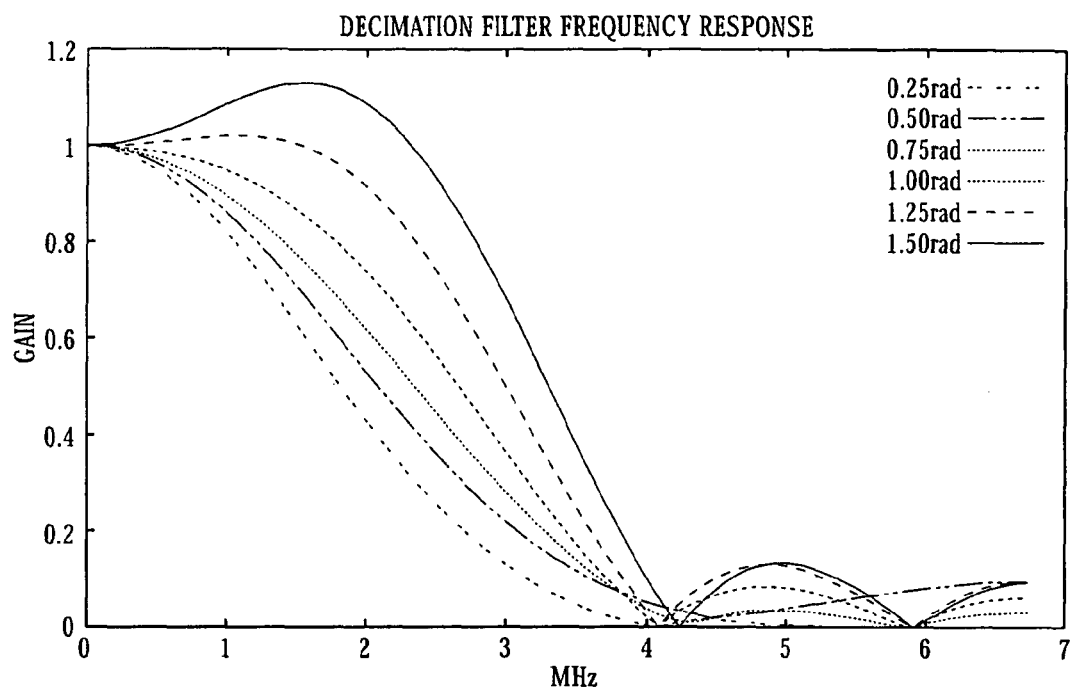
FIG. 5 illustrates actual frequency responses of the filter module of FIG. 3.

Using rectangular windowing technique known for its characteristic smooth transition in cut-off frequency region as an advantage, the series of six filters have been designed with frequency responses in FIG. 4. Referring to FIG. 5, the desired actual frequency responses of the filters are shown having smooth transitions between the different sets of filters.

The designed filter coefficients are tabulated and shown in Table 1. The filter coefficients are predetermined and are easily selected by one skilled in the art. The Filter States indicate the strength of the adaptive filtering with 1 being the lowest filtering and 6 being the highest filtering. A selected filter response will thus correspond to one of the Filter States.

TABLE 1

| | Filter States | | | | | |
|---|---|---|---|---|---|---|
| | 1 | 2 | 3 | 4 | 5 | 6 |
| | Mid Frequency attenuation | | | | | |
| Filter Coefficients | 0.25 rads | 0.50 rads | 0.75 rads | 1.00 rads | 1.25 rads | 1.50 rads |
| C0 | 66 | 82 | 88 | 96 | 110 | 129 |
| C1 = C-1 | 62 | 61 | 65 | 71 | 79 | 86 |
| C2 = C-2 | 25 | 23 | 22 | 20 | 15 | 6 |
| C3 = C-3 | 8 | 3 | −3 | −11 | −21 | −28 |

Pre-filtering video data with the filter module 101 removes coding artifacts like ringing and blocking with its better coding efficiency than non-filtered data. The resulting visual quality is also better compared to the normal low pass filtered data as parts of the high frequency components are not filtered away.

The present example of the filter module 101 was applied as decimation from D1 to CIF conversion on soccer game play sequences with fast motion as well as a typical test pattern of a flower garden scene with high texture details before being encoded in MPEG-4.

With the strongest filter, the flower garden scene achieved a maximum bit rate reduction of up to 36.9% when encoded with a fixed quantizer having an average bit-rate of 800 kbps and a maximum quantizer drop of 13.7 when encoded at a constant bit rate at 800 kbps, indicating the potential of pre-filtering video data.

The present embodiment includes a dynamic selection of an appropriate filter response for filtering each frame of the input video data. The appropriate filter response being selected from a predetermined set of filters having predetermined coefficients to control the filters response. Referring to Table 1, an example of the predetermined filter response is shown where the Filter States indicate the corresponding filter response and the plurality of corresponding filter coefficients to be applied.

The tuning parameters used to tune the selection of the filters may be from the encoding process or from other preprocessing information. The former adds several pictures delay to the filtering while the latter either adds complexity or is dependent on limited information from other pre-processing functions. The tuning parameters are: motion, quantization, variance and mean square error prediction and are further described in the following paragraphs. However, the tuning parameters extracted are dependent on the type of video encoder used as well as the video encoding sub-processes. At least one of the four tuning parameters may be considered for extraction depending on the video encoder in use and the video encoding sub-processes. Other pre-processing information may be for example consecutive field differences for progressive interlace detection or percentage of moving pixels during a scene change.

In operation, the method in accordance with the present embodiment for adaptive pre-filtering of input video data for video encoding starts with the step of receiving the input video data to the filter module 101 and the video encoder 106. The input video data first undergoes extraction of the tuning parameters by the extraction module 102.

Next, the step of processing at least one of these tuning parameters to generate at least one corresponding control parameter representative of the input video data received, is performed by the computation module 103.

Following which, the step of the control parameters generated are coupled to a predetermined filter response by the integration module 104 is performed. In this step, a filter response is selected from a predetermined plurality of filter responses. An example of which is shown in Table 1, where each of the Filter States of Table 1 correspond to a predetermined filter response.

Next, the step of generating the filter coefficients based on the selected filter response is performed by the Filter Coefficient Generator (FCG) 105. The required values the filter coefficients are retrieved from the selected filter response and generated by the FCG 105 to apply to the filter module 101.

Next, the input video data 99 is then filtered by the filter module 101 using the generated filter coefficients producing the filtered video data 99a which is then sent to the video encoder 106 for video encoding and compression.

When performing the step of processing the tuning parameters into control parameters, the tuning parameters are each processed according to their relative characteristics.

Processing tuning parameters into control parameters

Motion can be used for masking human vision in a technique known as psycho-visual enhancement. Strong filters are selected for motion scenes with rapid motion where details cannot be discerned and blurring of images is a natural phenomenon. Weak filters are selected for slower motion scenes where details are more easily discernible.

In hierachical or recursive motion search algorithms, motion search may be split into the coarse and fine search stages. Coarse search may be operated on a decimated pixel window and may be performed between consecutive pictures. Despite the lower accuracy of coarse search, it may be an advantage to use coarse motion vectors if it is available for all picture and macroblock types including Ipicture, intra encoded and skipped macroblocks.

I-picture are intra coded picture or pictures that uses only information from a current frame for encoding purposes. Intra encoded macroblocks are macroblocks encoded with original pixel values within the macroblock as opposed to inter-pixel values which use pixel values from outside the macroblock. Skipped macroblocks are macroblocks that are not encoded but indicated in the bitstream as having been skipped.

At macroblock level, each set of coarse motion vectors is extracted to give macroblock coarse motion magnitude $CMV_{mb}$ and accumulated to produce accumulated macroblock coarse motion magnitude $S\_CMV_{mb}$.

The accumulated macroblock coarse motion magnitude is thus represented by:
where, $$S\_CMV_{mb,i} = \sum_{j=0}^{i} CMV_{mb,j};$$

$$CMV_{mb,i} = |CMV_{mb,i,x}| + |CMV_{mb,i,y}|;$$

$|CMV_{mb,i,x}|$ is the horizontal coarse motion vector, $|CMV_{mb,i,y}|$ is the vertical coarse motion vector and i is the number of marcoblocks being calculated.

At picture level, the accumulated macroblock coarse motion magnitude $S\_CMV_{mb}$ are summed to give picture coarse motion, $CMV_{pic}$ and averaged to give the average coarse motion magnitude:
where $$AVG\_CMV_{pic,k} = CMV_{pic,k} / N_{mb,k};$$

$$CMV_{pic,k} = S\_CMV_{mb,N_{mb,k}} = \sum_{j=0}^{N_{mb}} CMV_j;$$

where $N_{mb,k}$ is the number of macroblocks with non-zero coarse motion magnitudes or a fraction of the number of macroblocks defined in the kth picture, whichever is larger.

An example fraction may be ⅔. This is done such that macroblocks that cannot be predicted during fast motion may be omitted in the average calculation and at the same time, the impact of regional motion or wrongly predicted macroblocks in a relatively static picture may be reduced.

In order to maintain stability and minimize oscillation, the average coarse motion magnitude $AVG\_CMV_{pic,k}$ is averaged over a predetermined period of N most recently encoded pictures, an example of which is N=4 to generate the control parameter, moving average coarse motion magnitude, MA_CMV and may be represented by:

$$MA\_CMV_{pic,k} = \sum_{j=k}^{k-N+1} AVG\_CMV_{pic,j}/N.$$

Alternatively, motion may be measured with fine motion vectors or the final motion vectors used for encoding. The fine motion forward search for P pictures is performed with reference to previous I/P picture, where P pictures are predicted pictures encoded with information from previous I pictures or P pictures. While the fine motion forward and backward search for B pictures that is bi-directional predicted pictures encoded with information from previous and next P or I pictures, is performed with reference to previous and next P or I pictures.

Accuracy is one advantage of fine motion vectors as they should represent real motion. However, fine motion vectors are only available for P and B pictures and may not be available in macroblocks coded as intra or skipped in MPEG-4 and No-MC (No motion compensation) in MPEG-2, depending on encoder architecture.

At macroblock level, the fine motion vectors of each macroblock are extracted and summed and then normalized according to the distance between the current and referenced frames to give fine motion magnitude $FMV_{mb}$.

For P pictures, the absolute of both the horizontal and vertical components for the frame forward motion vectors are summed and scaled to a scale factor ($M_{dist}-1$) for precision, where $M_{dist}$ is the distance between consecutive I/P pictures. The fine motion magnitude at macroblock level for P pictures may be represented by:

$$FMV_{mb,i} = \{|FMV_{mb,i,fwd,x}| + |FMV_{mb,i,fwd,y}|\} \times (M_{dist}-1).$$

If the encoder architecture provides only the minimal encoding motion vectors, macroblocks with forward motion vector or with macroblock pattern are considered including No-MC mode in MPEG-2 but intra coded macroblocks are excluded.

For B pictures, all forward, backward and bi-directional motion modes are considered. Again intra coded macroblocks are excluded.

For forward motion mode, $$FMV_{mb,i} = FMV_{mb,i,fwd} = \{|FMV_{mb,i,fwd,x}| + |FMV_{mb,i,fwd,y}|\} \times (M_{dist}-(f_{pic} \% M_{dist})) \times M_{dist}$$

The scale factor here normalizes the forward motion vector according to the distance from the forward reference frame and the current B frame. fpic refers to the frame number with 0 indicating the first I picture.

For backward motion mode, $$FMV_{mb,i} = FMV_{mb,i,bwd} = \{|FMV_{mb,i,bwd,x}| + |FMV_{mb,i,bwd,y}|\} \times (f_{pic} \% M_{dist}) \times M_{dist};$$

Similarly, the scale factor here normalizes the backward motion vector according to the distance from the backward reference frame and the current B frame.

For bi-directional pictures, $$FMV_{mb,i} = (FMV_{mb,i,fwd} + FMV_{mb,i,bwd})/2$$

The fine motion magnitude $FMV_{mB}$ may be accumulated at macroblock level to produce accumulated fine motion magnitude $S\_FMV_{mb}$ and may be represented by:

$$S\_FMV_{mb,i} = \sum_{j=0}^{i} FMV_{mb,j}.$$

At picture level, the macroblock fine motion magnitude are summed to give picture fine motion, $FMV_{pic}$, and averaged to give the average macroblock fine motion magnitude $AVG\_FMV_{pic}$, represented by:
where $$AVG\_FMV_{pic,k} = FMV_{pic,k} / N_{mb,k};$$

$$FMV_{pic,k} = S\_FMV_{mb,N_{mb,k}} = \sum_{j=0}^{N_{mb}} FMV_{mb,j};$$

and $N_{mb}$ is the number of respective macroblocks discussed above.

In order to maintain stability and minimize oscillation, the fine motion magnitude is averaged over a predetermined period of most recently P/B encoded pictures an example of which is N=4 to generate control parameter, moving average fine motion magnitude, MA_FMV, represented by:

$$MA\_FMV_{pic,k} = \sum_{j=k}^{k-N+1} AVG\_FMV_{pic,j} / N.$$

The encoding parameter, quantizer, is an indication of the encoding difficulty of the sequence for that particular resolution and target bit-rate, making it a good criterion for selecting appropriate filters. If the quantizer step-size is large, the section is difficult to encode and pre-filtering video data either reduces the number of bits to encode or decreases the quantization step size to reduce ringing and blocking artifacts. On the other hand, if the quantizer step-size is small, the section is easier to encode and thus little or no filtering is needed.

The tuning parameter Quantization may be measured by the quantizer_scale_code and quantizer_scale_type in MPEG-2 or simply the quantizer step-size and quantization mode (H.263/MPEG-2) in MPEG-4 together with the quantization matrix. Although quantizer values are available for all picture types, but I-Picture has purely intra-coded macroblocks, P-Picture has more intra-coded than inter-coded macroblocks while B-Picture has mainly inter-coded macroblocks. As the intra and inter quantization are different, the quantizer values must be normalized to ensure they are equivalent represented.

Typical rate control in MPEG-2 shows three experimental constants ki, kp and kb relating the overall quantization parameters, Qi, Qp and Qb in I, P and B pictures such that the same picture quality is achieved. The relationship may be represented by:

$$\frac{Q_i}{k_i} = \frac{Q_p}{k_p} = \frac{Q_b}{k_b}.$$

If ki is set to 1, typical values of kp and kb are 1 and 1.6. This is an alternative normalization according to picture type to intra/inter-coding mode.

At macroblock level, the macroblock quantizer, $Q_{mb}$, is extracted and accumulated to accumulated macroblock quantizer $S\_Q_i$.

In MPEG-2, the accumulated macroblock quantizer is represented by $$Q_{mb,i} = \begin{cases} quan\_scale\_code \times 2 & quan\_scale\_type = linear \\ non\_linear\_quan\_scale \\ [quan\_scale\_code] & quan\_scale\_type = non\_linear \end{cases};$$

In MPEG-4, the accumulated macroblock quantizer is represented by
where $$Q_{mb,i} = quan\_scale\_code \times 2;$$

$$S\_Q_{mb,i} = \sum_{j=0}^{i} Q_{mb,j}.$$

At picture level, the average macroblock quantizer of the picture is normalized by the respective ki, kp and kb set in the parameter file and $N_{mb}$ is the number of macroblocks in the picture. The average macroblock quantizer may be represented by:

$$AVG\_NQ_{pic,k} = NQ_{pic,k}/N_{mb};$$

where $$NQ_{pic,k} = \begin{cases} \sum_{j=0}^{N_{mb}-1} Q_{mb,j}/N_{mb}/k_i & I-\text{Picture} \\ \sum_{j=0}^{N_{mb}-1} Q_{mb,j}/N_{mb}/k_p & P-\text{Picture} \\ \sum_{j=0}^{N_{mb}-1} Q_{mb,j}/N_{mb}/k_b & B-\text{Picture} \end{cases}$$

In order to maintain stability and minimize oscillation, the normalized quantizer is averaged over a predetermined period of N most recently encoded pictures, an example of which is N=4 to generate the control parameter, moving average quantizer, MA_NQ, where $$MA\_NQ_{pic,k} = \sum_{j=k}^{k-N+1} AVG\_NQ_{pic,j}/N.$$

The tuning parameter variance is an alternative expression of the amount of AC energy in the input video signal. It gives an indication of spatial redundancy and intra coding efficiency. The higher the variance energy, the more complicated the details and texture in the picture. A higher coding bit-rate is thus required to achieve a similar PSNR when compared to other sequences. Pre-filtering achieves bit-rate reduction for the same quantizer encoding values at the expense of attenuating the high frequency components.

Variance of each M×M block is defined by $$Var = \left(\sum_{y=0}^{7}\sum_{x=0}^{7} pix_{x,y}^2\right)/64 - \left(\sum_{y=0}^{7}\sum_{x=0}^{7} pix_{x,y}\right)^2/M^2.$$

When considering for example MPEG-2 encoding, M=8 and 8×8 blocks are considerred.

At macroblock level, the block variance at macroblock level, $Var_{mb}$, is computed and accumulated to accumulated block variance $S\_Var_{mb}$ where $$Var_{mb,i} = \sum_{y=0}^{1}\sum_{x=0}^{1} Var_{i,x,y}/4;$$

and $$S\_Var_{mb,i} = \sum_{j=0}^{i} Var_{mb,j}.$$

At picture level, the accumulated block variance of the picture is averaged among the number of macroblocks, Nmb in the picture, and may be represented by:

where $$AVG\_Var_{pic,k} = Var_{pic,k}/N_{mb};$$

$$Var_{pic,k} = S\_Var_{mb,N_{mb}} = \sum_{j=0}^{N_{mb}} Var_{mb,j}/N_{mb}.$$

In order to maintain stability and minimize oscillation, the block variance is averaged over a predetermined period of N most recently encoded pictures, an example of which is N=4 to generate control parameter, moving average block variance, MA_VAR may be represented by:

$$MA\_Var_{pic,k} = \sum_{j=k}^{k-N+1} AVG\_Var_{pic,j}/N.$$

The tuning parameter Mean Square Error Prediction (MSE) is a measurement of variation of error prediction, namely the difference between predicted and original video data. It indicates temporal redundancy and inter coding efficiency. High MSE associates with low temporal redundancy and high difficulty of encoding which may be caused by fast motion or high texture. Pre-filtering attenuates the picture high frequency details and increases the possibility of a better match predicted block and lower prediction error.

MSE is defined for each macroblock by $$MSE_{mb,i} = \sum_{y=0}^{15}\sum_{j=0}^{15} (pix_{i,x,y} - pred_{i,x,y})^2.$$

At macroblock level, the MSE is accumulated to give $S\_MSE_{mb}$ where:

$$S\_MSE_{mb,i} = \sum_{j=0}^{i} MSE_{mb,j}.$$

At picture level, the average mean square error prediction of the picture is averaged among the number of macroblocks, Nmb, with non-zero MSE in the picture i.e. the macroblocks with inter-coding mode and non-zero coding block pattern, where $$MSE_{pic,k} = \sum_{j=0}^{N_{mb,k}} MSE_{mb,j}/N_{mb,k};$$

and $$AVG\_MSE_{pic,k} = MSE_{pic,k}/N_{mb,k}.$$

As the motion modes are different in P- and B-pictures, the MSE of the P and B are tracked differently at picture level. To maintain stability and minimize oscillation, the moving MSE of P- and B-Pictures are averaged over a predetermined period of N most recently encoded pictures P-Pictures and M most recently encoded B-Pictures, an example of which is N=1 and M=2 to generate control parameters, moving average MSE, MA_PMSE and MA_BMSE, where $$MA\_PMSE_{pic,k}|MA\_BMSE_{pic,k} = \sum_{j=k}^{k-N+1} AVG\_MSE_{pic,j}/N.$$

Figure 6:
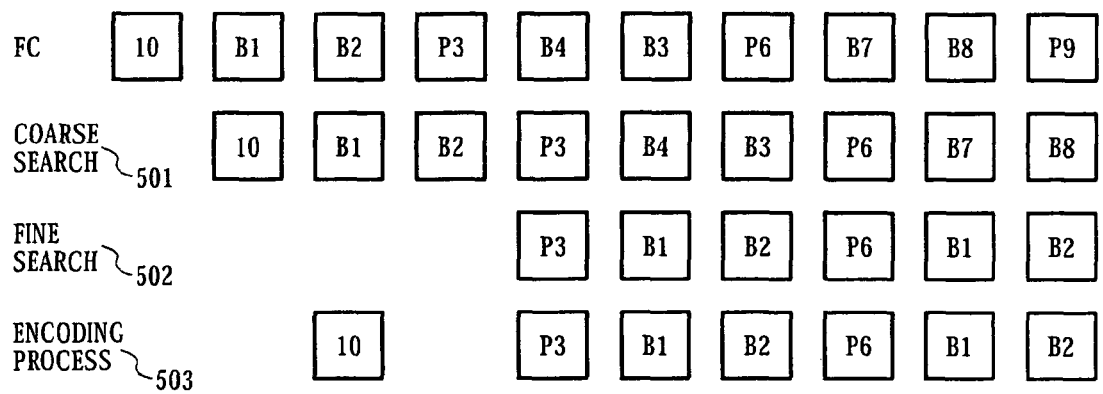
FIG. 6 illustrates a representation of time correlation of coarse and fine motion search with respect to encoding process in accordance with the present embodiment.

In the best case scenario, the format converter 204 may be last pre-processing function before the coarse search in the motion estimator 205. FIG. 6 illustrates an example embodiment of the picture delay of the tuning parameters to the pre-filtering function. The coarse motion information of picture n−2 from coarse search 501 is available only in the pre-filtering of picture n. The fine motion search 502 may not be operated in pre-processing order but in encoding order. As a result the fine motion information may incur two and five pictures latency for P and B pictures respectively. The other tuning parameters, normalized quantizer, block variance and mean square error prediction, extracted during the in-loop encoding process 503 in encoding order, incurs similar two and five pictures latency for P/I and B pictures respectively.

Coupling control parameters to filter response

The step of coupling the at least one control parameter generated to a predetermined filter response further comprises selecting one of a plurality of predetermined filter responses. The value of the control parameter generated is compared with a plurality of predetermined threshold values which corresponds to the plurality of predetermined filter responses. The selection of one of the predetermined filter response is by way of matching the control parameter to a predetermined threshold value which corresponds to the filter response.

The control parameters are grouped in two categories depending on their degree of interaction with the filtering strength:

moving average coarse and fine motion magnitude and normalized quantizer; and moving average block variance and mean square error prediction.

The first group of control parameters changes with the strength of filtering and controls adaptive pre-filtering by comparing their absolute magnitude against a set of pre-determined thresholds to generate a recommended filter state, Fsrec. An example set of predetermined thresholds values, exponential for motion and linear for normalized, are shown below.

$$FS_{rec} = \begin{cases} 1 & MA\_CMV \le 8 \\ 2 & 4 < MA\_CMV \le 8 \\ 3 & 8 < MA\_CMV \le 16 \\ 4 & 16 < MA\_CMV \le 32 \\ 5 & 32 < MA\_CMV \le 64 \\ 6 & MA\_CMV > 64 \end{cases}$$

This example set of predetermined thresholds for fine motion magnitude is tuned for Mdist=3.

$$FS_{rec} = \begin{cases} 1 & MA\_FMV \le 12 \\ 2 & 12 < MA\_FMV \le 24 \\ 3 & 24 < MA\_FMV \le 48 \\ 4 & 48 < MA\_FMV \le 96 \\ 5 & 96 < MA\_FMV \le 192 \\ 6 & MA\_FMV > 192 \end{cases}$$

$$FS_{rec} = \begin{cases} 1 & MA\_NQ \le 10 \\ 2 & 10 < MA\_NQ \le 18 \\ 3 & 18 < MA\_NQ \le 26 \\ 4 & 26 < MA\_NQ \le 34 \\ 5 & 34 < MA\_NQ \le 42 \\ 6 & MA\_NQ > 42 \end{cases}$$

As such, if considering the control parameter moving average quantization, if the calculated value is between 18 and 26, the filter response to e selected would correspond to Filter State 3. Referring to Table 1, the coefficients of the filter response to be adopted would then correspond to the column under Filter State 3.

If however the FSrec is higher than the current filter state, FScur, then the output FSrec is clipped to one step increment away from FScur and vice versa. This is done to avoid rapid fluctuation in filter state and eliminate temporal visual flicker.

$$FS_{rec} = \begin{cases} FS_{cur} - 1 & FS_{rec} < FS_{cur} \\ FS_{cur} + 1 & FS_{rec} > FS_{cur} \\ FS_{cur} & FS_{rec} = FS_{cur}; \end{cases}$$

With the step change, FSrec is applied to the next D1 picture for CIF conversion.

The second group of control parameters, moving average block variance $MA\_Var_{pic,i}$ and mean square error prediction $MA\_MSE_{pic,i}$ changes more dynamically with the strength of filtering. These second group of control parameters are thus used to adaptive pre-filtering by comparing their relative magnitude against a set of pre-determined target magnitudes.

Target control variance $TARGET\_Var_{pic}$ and Target control MSE for P and B pictures $TARGET\_MSE_{pic}$ are set at predetermined values, example of which may be respectively 750, 100,000 and 40,000 for a specific bit-rate of 768 kbps. Normalized quantizer may alternatively control filtering in the same way.

The differences between the target control magnitudes and the values of the respective control parameter are calculated to produce Error control magnitudes where Error control Variance is represented by:

$Err\_Var_{pic,i} = MA\_Var_{pic,i} - TARGET\_Var_{pic}$; and

Error control MSE is represented by:

$Err\_MSE_{pic,i} = MA\_MSE_{pic,i} - TARGET\_MSE_{pic}$.

The error control magnitudes are fed back to adjust the filter response and thus affect the selection of the filter response and the Filter States. Higher filter state requires higher differences to initiate change while lower filter state requires lower differences to initiate change. The rise and fall of pre-filtering towards the stronger and weaker extremes are controlled by the small increasing deviations to manage the latency between filtering and feedback of tuning parameters.

A recommended filter state, FSrec corresponding to one of the predetermined plurality of filter responses is determined by comparing $Err\_Var_{pic}$ or $Err\_MSE_{pic}$ against a set of pre-determined thresholds depending on the current filter state, FScur which corresponds to a current filter response.

The predetermined thresholds are a set of deviation values, (pDev,nDev) An example of which are presented below with (pDev,nDev) being symmetrical.

$$(pDev\_Var, nDev\_Var) = \begin{cases} (40, 120) & FS_{cur} = 1 \\ (60, 100) & FS_{cur} = 2 \\ (80, 80) & FS_{cur} = 3 \\ (100, 60) & FS_{cur} = 4 \\ (120, 40) & FS_{cur} = 5 \text{ or } 6 \end{cases}$$

$$(pDev\_pMSE, nDev\_pMSE) = \begin{cases} (1000, 3000) & FS_{cur} = 1 \\ (1500, 2500) & FS_{cur} = 2 \\ (2000, 2000) & FS_{cur} = 3 \\ (2500, 1500) & FS_{cur} = 4 \\ (3000, 1000) & FS_{cur} = 5 \text{ or } 6 \end{cases}$$

$$(pDev\_bMSE, nDev\_bMSE) = \begin{cases} (500, 1500) & FS_{cur} = 1 \\ (750, 1250) & FS_{cur} = 2 \\ (1000, 1000) & FS_{cur} = 3 \\ (1250, 750) & FS_{cur} = 4 \\ (1500, 500) & FS_{cur} = 5 \text{ or } 6 \end{cases}$$

Positive difference results in increasing the filtering strength and negative difference results in decreasing the filtering strength. The final filtering strength is clipped to 5 because the strongest filter design has a large attenuation in the high frequency components and results in picture blurring and may not be justifiable for only spatial and temporal redundancy characteristics and intra and inter coding efficiency.

$$FS_{rec} = \begin{cases} FS_{cur} + 1 & Err \geq pDev \\ FS_{cur} - 1 & FS_{rec} \leq -(nDev)/2 \\ FS_{cur} & -(nDev)/2 < Err < pDev \end{cases}$$

$$FS_{rec} = \begin{cases} 5 & FS_{rec} > 5 \\ 1 & FS_{rec} < 1 \\ FS_{rec} & 1 \leq FS_{rec} \geq 5 \end{cases}$$

At least one control parameter or more may be combined to adapt the strength of pre-filtering. The preferred integration of the above described tuning parameters is to select the maximum recommended filter state, FSrec, among the individual control parameters like motion MV (either coarse or fine motion magnitude), quantization NQ, block variance Var and mean square error prediction MSE because each parameter has its distinct properties. The final or next filter state, FSnex, is restricted to be incremented or decremented by one step for one consecutive picture for stability and flickering control.

$$FS_{rec} = \max FS_{rec}(MV, NQ, Var, MSE)$$

$$FS_{nex} = \begin{cases} FS_{cur} + 1 & FS_{rec} > FS_{cur} \\ FS_{cur} - 1 & FS_{rec} < FS_{cur} \\ FS_{cur} & FS_{rec} = FS_{cur} \end{cases}$$

Generating filter coefficients on selected filter response

In typical MPEG-2 systems, the video pre-processor and the video encoder subsystems operate independently and are linked only by the capacity of picture buffers in the memory system. The dynamic latency of the feedback loop from the video encoder subsystem to the video pre-processor for the adaptive pre-filtering poses a technical challenge.

In the present embodiment, the dynamic latency between the subsystems is handled by the adaptive pre-filtering system 100 assuming a fixed system latency. This fixed latency is the maximum picture latency between the video encoder and the video pre-processor subsystems.

The adaptive pre-filtering works using feedback mechanisms between the video encoder and the video pre-processor. There may be variable delayed responses between filtering and feedback. This maximum picture latency is guaranteed by the number of frame buffers available in memory and the operations of the encoding system.

The system latency translates to a delayed response between the change in video characteristic and correlated action of the filter. For the tuning parameters such as motion and quantizer, the impact is an n delay where n is the system delay for propagating the change in video characteristic from its occurrence to its detection by the encoder and subsequent feedback to the change of the filter.

However for block variance or mean square error prediction, there is closer interaction between the value of the tuning parameter and the strength filtering. The block variance or mean square error prediction decreases as the filter strength increases. This problem is further complicated when the system latency is introduced as the maximum filter strength may be reached even before the first increase in filter strength is effected. This will result in overshoots and undershoots of the desired filtering strength level and subsequent oscillations for adjustments. The total delay for the correct filtering strength to be reached is $$kn + \sum_{j=1}^{k} m_j$$

where m is the steps needed in the change of the filter and k is the number of oscillations.

The present embodiment resolves the problem by compensating for the latency by increasing the time response of the filter in the digital domain. This is achieved through increasing the number of steps between one filter strength to another either by adjusting the strength minutely or delaying the transition between the different filters. The number of transitions inserted between the predefined filters according to the programmed system latency, lat, is defined as (lat−2)/2. For a best case operation, the encoder system lags the video pre-processor by 2 pictures, giving 1 step transition. For a system latency of 10, there are 4 transitions inserted, giving a total of 5 transitions per change in defined filter response.

To make the transitions smoother, intermediate filter strengths are derived by adaptation of pre-determined filter response using the linear weighted distance average of the two neighboring pre-defined filter responses instead of a filter re-design. For an example transition which is nearer to the lower pre-defined filter has a higher weight than the upper pre-defined filter.

The filtering states are increased accordingly by factor (lat−2)/2 and the control parameters are coupled to finer filter responses. The basic application methodology remains but intermediate filter stages are assigned or transited via simple linear interpolation of thresholds between key pre-determined filter stages.

The present disclosed embodiment for the adaptive pre-filtering of input video data before video encoding advantageously reduces video data complexity, thus enabling ease of encoding of video data by video encoders. Furthermore, video artifacts like blocking and ringing which are pre-dominant in low bit rate applications are advantageously reduced.

Adaptive pre-filtering of input video data to reduce encoding complexity also to improves visual quality of video by using smaller quantization step size.

The present invention has potential applications in a wide diversity of products. Virtually any video processing system or equipment or device having a video encoder may use the present invention for adaptive pre-filtering. Some examples may be DVD reader/writers and server applications for real time video streaming.

Figure 8:
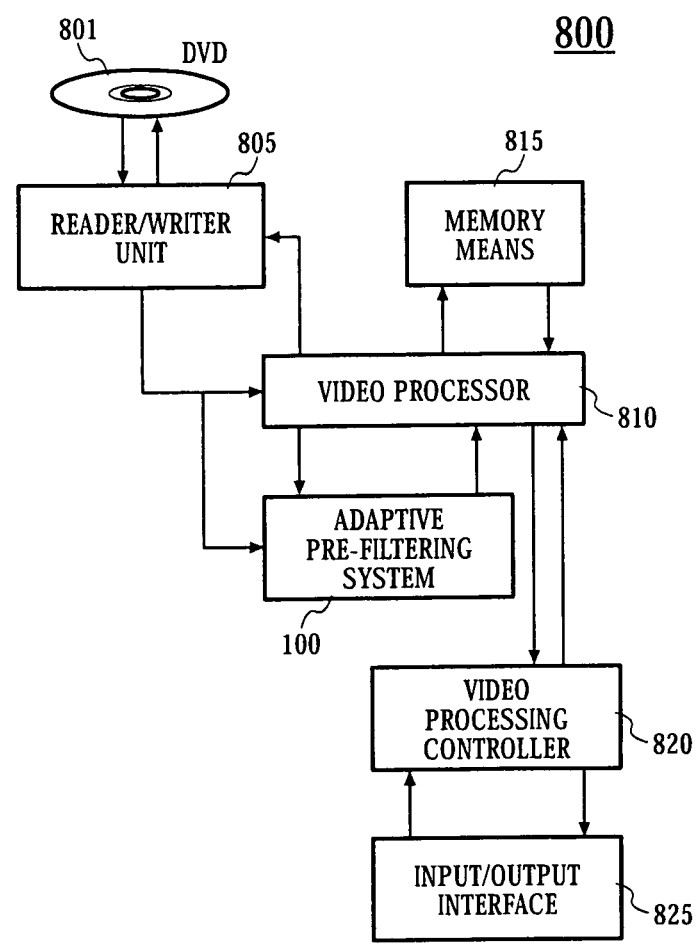
FIG. 8 illustrates a block diagram of a DVD reader/writer 800 in accordance with the embodiment of FIG. 1.

Referring to FIG. 8, a video processing system an example of which may be a DVD reader/writer 800 is shown. The DVD reader/writer 800 accesses a DVD disc 801 using a Reader/Writer unit 805 which is coupled to the video preprocessor 810. The video preprocessor 810 utilizes the adaptive pre-filtering system 100 to pre-filter the input data according to the encoder being used. The preprocessed and pre-filtered data is then processed by the video processing controller 820 which is coupled to the input/output interface 825 for sending to another communications device such as a personal computer.

Figure 9:
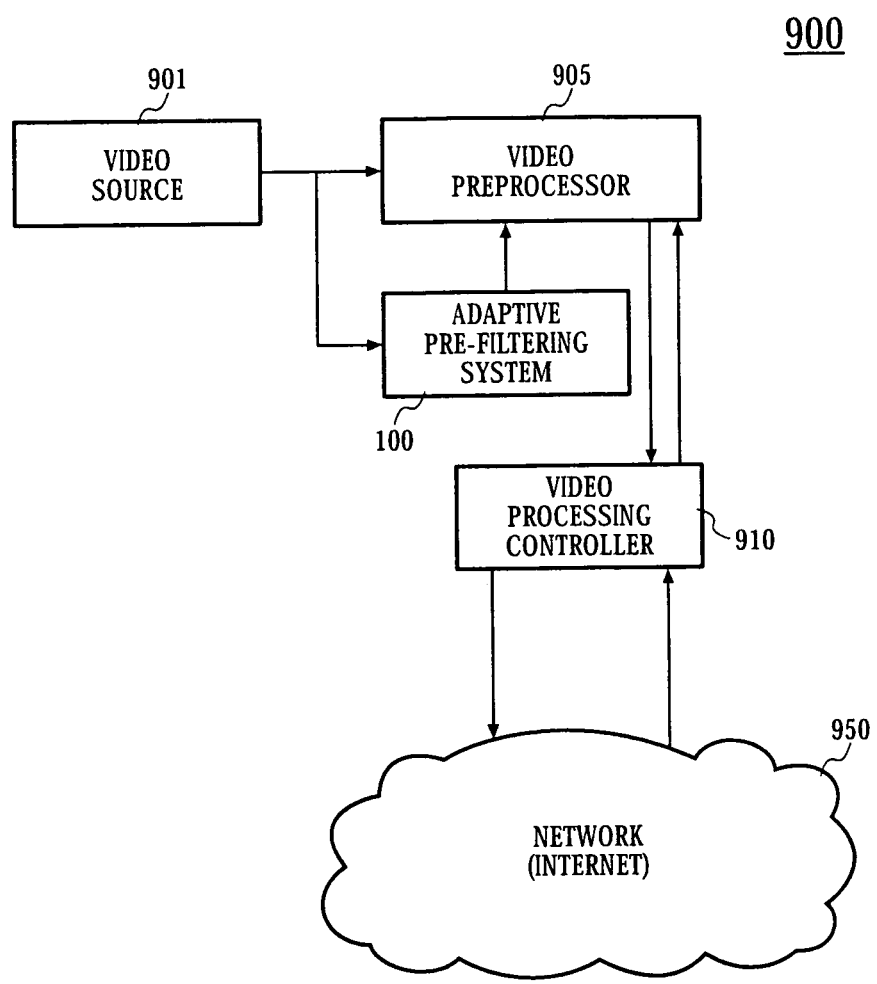
FIG. 9 illustrates a block diagram of a real time video streaming server 900 in accordance with the embodiment of FIG. 1

Referring to FIG. 9, another video processing system such as a real time video streaming server 900 may receive video data from a video source 901. The video preprocessor 905 utilizes the adaptive pre-filtering system 100 to pre-filter the video data according to the encoder being used. The preprocessed and pre-filtered data is then processed by the video processing controller 910 which is coupled to a network 950 such as the internet allowing users to access the video data in real time.

It will be further appreciated that although the embodiments have been described in detail, various modifications and improvements can be made by a person skilled in the art without departing from the scope of the present invention.

What is claimed is:

1. A method for adaptive pre-filtering of input video data for video encoding using a linear filter module, comprising:
   receiving the input video data, wherein the input video data includes at least one tuning parameter of the group consisting of motion, quantization, variance, and mean square error prediction;
   extracting the at least one tuning parameter according to a type of video encoding;
   processing the at least one tuning parameter to generate at least one corresponding control parameter;
   coupling the at least one control parameter to a predetermined filter response;
   generating a plurality of filter coefficients based on the predetermined filter response;
   filtering the input video data with the linear filter module having the applied plurality of filter coefficients; and
   compensating for dynamic latency between the filtered input video data and a video encoding process.

2. The method according to claim 1, wherein processing the at least one tuning parameter to generate at least one corresponding control parameter further comprises:
   extracting a plurality of coarse motion vectors at a macroblock level to produce a plurality of macroblock coarse motion magnitudes;
   accumulating the plurality of macroblock coarse motion magnitudes to produce a plurality of accumulated macroblock coarse motion magnitudes;
   summing and averaging the plurality of accumulated macroblock coarse motion magnitudes at picture level to produce an average coarse motion magnitudes; and
   averaging the average coarse motion magnitude over a predetermined period of most recently encoded pictures to produce moving average coarse motion magnitude control parameter.

3. The method according to claim 1, wherein coupling the at least one control parameter further comprises:
   selecting one of a plurality of predetermined filter responses corresponding to one of a plurality of predetermined threshold values;
   wherein a value of the at least one control parameter matches the one of the plurality of predetermined threshold values.

4. The method according to claim 3, wherein the filter response is incrementally changed by one step from a current filter response.

5. The method according to claim 1, wherein compensating for the dynamic latency further comprises:
   determining a maximum picture latency;
   increasing time response of the filter module in a digital domain by inserting a plurality of transitions into the filter module; and
   determining a plurality of intermediate filter responses corresponding to the plurality of transitions by using linear weighted distance average of two neighboring filter responses of each of the plurality of intermediate filter responses.

6. The method according to claim 1, wherein the linear filter module is adapted for attenuation at high frequencies while retaining portions of the high frequency components.

7. The method according to claim 6, wherein the linear filter module comprises a plurality of low pass filters having a range of step cut-off frequencies and a range of normalized magnitudes.

8. The method according to claim 7, wherein the range of step cut-off frequencies range between normalized bandwidth values of 1.0 to 0.167.

9. The method according to claim 8, wherein the range of normalized magnitudes range from 1.0 to 0.3.

10. A video processing system comprising:
   an adaptive pre-filtering system configured to adaptively pre-filter an input video data for video encoding, the adaptive pre-filtering system comprising:
   a filter module configured to receive and filter the input video data to produce a filtered video data, the filter module responsive to a plurality of predetermined filter responses, wherein the input video data includes at least one tuning parameter of the group consisting of motion, quantization, variance, and mean square error prediction;
   a video encoder configured to encode and compress the filtered video data according to an encoding process;
   an extraction module configured to extract the at least one tuning parameter from the input video data according to the encoding process;
   a computation module configured to receive and process the at least one tuning parameter into at least one control parameter; and
   an integration module configured to process the at least one control parameter and for selecting one of the plurality of filter responses;
   wherein the at least one tuning parameter comprises one or more of the following: motion, quantization, variance and mean square error prediction; and
   wherein the adaptive pre-filtering system is also configured to compensate for dynamic latency between the filtered input video data from the filter module and the video encoder.

11. The video processing system according to claim 10, wherein the adaptive pre-filtering system further comprises a filter coefficient generator configured to generate filter coefficients according to the filter response.

12. The video processing system according to claim 10, wherein the filter module is adapted for attenuation at high frequencies while retaining pollions of the high frequency components.

13. The video processing system according to claim 12, wherein the filter module comprises a plurality of low pass filters having a range of step cut-off frequencies and a range of normalized magnitudes.

14. The video processing system according to claim 13, wherein the range of step cut-off frequencies range between normalized bandwidth values of 1.0 to 0.167.

15. The video processing system according to claim 13, wherein the range of normalized magnitudes range from 1.0 to 0.3.

16. The video processing system according to claim 10, wherein the video processing system comprises a DVD reader.

17. The video processing system according to claim 10, wherein the video processing system comprises a DVD writer.

18. The video processing system according to claim 10, wherein the video processing system comprises a server application for real time video streaming.

19. A method for adaptive pre-filtering of input video data for video encoding using a linear filter module, comprising:
   receiving the input video data, wherein the input video data includes at least one tuning parameter of the group consisting of motion, quantization, variance, and mean square error prediction;
   extracting the at least one tuning parameter according to a type of video encoding;
   processing the at least one tuning parameter to generate at least one corresponding control parameter;
   coupling the at least one control parameter to a predetermined filter response;
   generating a plurality of filter coefficients based on the predetermined filter response; and
   filtering the input video data with the linear filter module having the applied plurality of filter coefficients;
   wherein processing the at least one tuning parameter to generate at least one corresponding control parameter further comprises:
      extracting a plurality of coarse motion vectors at a macroblock level to produce a plurality of macroblock coarse motion magnitudes,
      accumulating the plurality of macroblock coarse motion magnitudes to produce a plurality of accumulated macroblock coarse motion magnitudes,
      summing and averaging the plurality of accumulated macroblock coarse motion magnitudes at picture level to produce an average coarse motion magnitude, and
      averaging the average coarse motion magnitude over a predetermined period of most recently encoded pictures to produce moving average coarse motion magnitude control parameter.

20. The method according to claim 19, wherein generating the plurality of filter coefficients further comprises:
   extracting, summing and normalizing a plurality of fine motion vectors at the macroblock level to produce a plurality of macroblock fine motion magnitudes;
   accumulating the plurality of macroblock fine motion magnitudes to produce a plurality of accumulated macroblock fine motion magnitudes;
   summing and averaging the plurality of accumulated macroblock fine motion magnitudes at picture level to produce an average fine motion magnitude;
   averaging the average fine motion magnitude over a predetermined period of most recently encoded pictures to produce the control parameter: moving average fine motion magnitude.

21. The method according to claim 19, wherein generating the plurality of filter coefficients further comprises:
   extracting a plurality of macroblock quantizers;
   accumulating the plurality of macroblock quantizers to produce a plurality of accumulated macroblock quantizers;
   averaging and normalizing the plurality of accumulated macroblock quantizers at picture level to produce an average macroblock quantizer; and
   averaging the average macroblock quantizer over a predetermined period of most recently encoded pictures to produce the control parameter: moving average quantizer.

22. The method according to claim 19, wherein generating the plurality of filter coefficients further comprises:
   computing a plurality of block variances at the macroblock level;
   accumulating the plurality of block variances to produce a plurality of accumulated block variances;
   averaging the plurality of accumulated block variances at picture level to produce an average block variance; and
   averaging the average block variance over a predetermined period of most recently encoded pictures to produce the control parameter: moving average block variance.

* * * * *

UNITED STATES PATENT AND TRADEMARK OFFICE
CERTIFICATE OF CORRECTION

PATENT NO. : 9,326,006 B2  
APPLICATION NO. : 11/514723  
DATED : April 26, 2016  
INVENTOR(S) : Chiang et al.

Page 1 of 1

It is certified that error appears in the above-identified patent and that said Letters Patent is hereby corrected as shown below:

In the Claims

Column 17, Line 67,     Delete: "magnitudes"  
Claim 2                Insert --magnitude--

Signed and Sealed this  
Ninth Day of August, 2016

Michelle K. Lee  
*Director of the United States Patent and Trademark Office*